SWITCHING SYSTEM WITH STATION CONTROLLED CLASS OF SERVICE

Filed March 11, 1968 9 Sheets-Sheet 1

INVENTORS D. J. MORGAN
C. C. NIELSON
J. G. WHITEMYER
BY [signature]
ATTORNEY

Nov. 24, 1970 D. J. MORGAN ET AL 3,542,962

SWITCHING SYSTEM WITH STATION CONTROLLED CLASS OF SERVICE

Filed March 11, 1968 9 Sheets-Sheet 2

Nov. 24, 1970 D. J. MORGAN ET AL 3,542,962

SWITCHING SYSTEM WITH STATION CONTROLLED CLASS OF SERVICE

Filed March 11, 1968 9 Sheets-Sheet 5

SWITCHING SYSTEM WITH STATION CONTROLLED CLASS OF SERVICE

Filed March 11, 1968

3,542,962

SWITCHING SYSTEM WITH STATION CONTROLLED CLASS OF SERVICE

Dennis J. Morgan, Westerville, Carl C. Nielson, Granville, and James G. Whitemyer, Reynoldsburg, Ohio, assignors to Bell Telephone Laboratories, Incorporated, Murray Hill, N.J., a corporation of New York Filed Mar. 11, 1968, Ser. No. 711,981
Int. Cl. H04m 3/42
U.S. Cl. 179—18 11 Claims

ABSTRACT OF THE DISCLOSURE

A switching system is arranged to permit telephone stations to select a class of service treatment which is different from that preassigned to the stations. The central office associated with such stations includes a central memory comprising a plurality of address locations each exclusively associated with an individual station and in which each station may cause the storage of a selected class of service code. The principal common control circuit is arranged to interrogate the memory prior to processing each calling connection to ascertain the current class of service treatment of the station involved. Where a class of service code is present in memory, the previously ascertained preassigned class of service information is inhibited, and the new class of service is subtituted therefor with resultant processing of the call in accordance with the new class of service.

BACKGROUND OF THE INVENTION

Field of the invention

This invention pertains to switching systems having stations with preassigned class of service designations and, more particularly, to switching systems in which the class of service of any station may be selectively changed by such station.

Description of the prior art

The automatic switching system introduced economy and flexibility into the telephone industry by eliminating the inherently slow manual establishment of telephone connections. Obviously, the initial automation of telephone service was possible only by the provision of a single, essentially identical, product. Thus, in the early stages of switching system development only one type, or class, of service was generally available to a telephone subscriber.

As time progressed, telephone systems increased in sophistication to the point where stations were provided with services which varied with their specific need. Initially these distinctions in service were extremely basic, i.e., single station residential, mulitparty selective ringing, PBX service, etc. As a result of recent more significant switching system sophistication, present telephone stations have available as many as 100 different classes of service; most of these are basic in nature but many are purely auxiliary in nature. This latter group includes many reecntly implemented sepcial service features, such as centralized abbreviated dialing (see W.A. Malthaner et al. Patent 2,951,908, dated Sept. 6, 1960), call transfer (see S. Kandel et al. Patent 3,363,063, dated Jan. 9, 1968), call-waiting (see M. E. Krom Patent No. 3,320,367, dated May 16, 1967), and add-on (see Krom patent, supra). Each of these auxiliary services greatly enhanced the convenience and flexibility of the telephone station as a means of communciation.

In order to properly complete connections to and from telephone stations in accordance with their respective class of service, it has been necessary to specifically identify the class of service designation, usually coded, which has been preassigned in the station involved. In early switching systems this designation was principally utilized to assist the control equipment in performing its function. Thus, for example, a specific class of service would indicate that the station was arranged for multiparty selective ringing service. This informattion in conjunction with the identity of the called station would then result in application of the proper ringing signal. Accordingly, the initial use of the class of service designation was not to restrict the class of service provided, but rather to simplify the implementation of the service required. However, the class of service designation has been employed more recently in a dual capacity, first, to simplify implementation of the service as before and, secondly, to prevent unauthorized use of a service to which a station is not entitled. Thus, the class of service designation concept may be considered today as both a means for insuring provision of a specific service and also as a means for insuring exclusion of all other services.

The present rigidity of this latter aspect results in an obviously inflexible arrangement since class of service may be changed only by prior arrangement with the local telephone company business office followed by appropriate equipment rearrangement at the central office. This requirement is, of course, cumbersome and results in a loss of revenue when it is recognized that many subscribers often desire a specific class of service, or station feature, for a limited interval of time not warranting the amount of effort and inconvenience presently required. For example, the call transfer service may be necessary to a business office on a permanently assigned basis, but may also be desired temporarily by a residential subscriber on varying and infrequent occasions. Since the present arrangement is discrete and relatively cumbersome, temporary change of class of service for the residential subscriber is not feasible. The net effect is to limit the extent to which call transfer and other similar classes of service are utilized by telephone stations. Obviously, a lesser volume of use of these services results in a decrease in the economical and efficient utilization of the common equipment associated therewith within the switching system.

Therefore, a need exists in the art for a switching system arrangement which will permit a telephone subscriber to selectively change the class of service designation preassigned to an asociated station (or stations). A need also exists for such an arrangement which will permit the subscriber to restore the class of service designation to that originally preassigned. A need also exists for an arrangement which will accomplish the foregoing in a manner which is expeditious and which involves minimal equipment changes in the associated switching system.

SUMMARY OF THE INVENTION

In the exemplary embodiment a telephone switching system is arranged with a memory having a plurality of address locations, each exclusively associated with a station served by the system, and each addressable by the line equipment location information of the respective station.

The system is arranged to respond to any one of a plurality of predetermined class of service change codes generated from any station by writing the code in the associated station's address location in the memory. The code thus transmitted represents any arbitrary class of service desired by the station involved. Concurrent with registration of this code in the memory, the switching system billing equipment is automatically advised and a permanent record is thereupon made for charging purposes.

Prior to establishing each originating or terminating call involving any station served by the system, the principal common control circuit is arranged to interrogate the memory using as an address the equipment location identity of the station. If no class of service code is present in the memory at the interrogated address location, the call proceeds in the usual manner. However, if a code is read from the memory, it is registered in the principal common control circuit. The class of service information previously registered therein is thereupon inhibited and replaced with the new class of service information. The calling connection is modified in accordance therewith and the call proceeds to completion.

When a station no longer requires the previously selected class of service, an erase code is generated by the station. This code causes the erasure of the class of service information previously stored in the memory at the station address location. It is also simultaneously transmitted to the billing equipment where a permanent record is made to indicate that the station involved is no longer utilizing the previously selected service. All originating and terminating connections involving the station are thereafter completed in accordance with the preassigned class of service information for that station in the conventional manner.

It is a feature of our invention that a switching system is arranged with equipment responsive to information transmitted from a telephone station to render effective a class of service arbitrarily selected by that station to replace a class of service preassigned to that station.

It is a further feature of our invention that a telephone station may accomplish the foregoing and subsequently restore the class of service treatment of the station to the class of service preassigned.

It is another feature of our invention that the foregoing features are accomplished in a switching system which is arranged to cause the automatic recording in message accounting equipment of the duration of use of an arbitrarily selected class of service.

It is still another feature of our invention that a switching system is arranged to permit a station to arbitrarily select a class of service resulting in a subsequent change in the manner in which originating and terminating calls to that station are processed.

BRIEF DESCRIPTION OF THE DRAWING

The foregoing objects, features and advantages, as well as others, of the invention will be more apparent from the following description of the drawing, in which.

Figure 1:
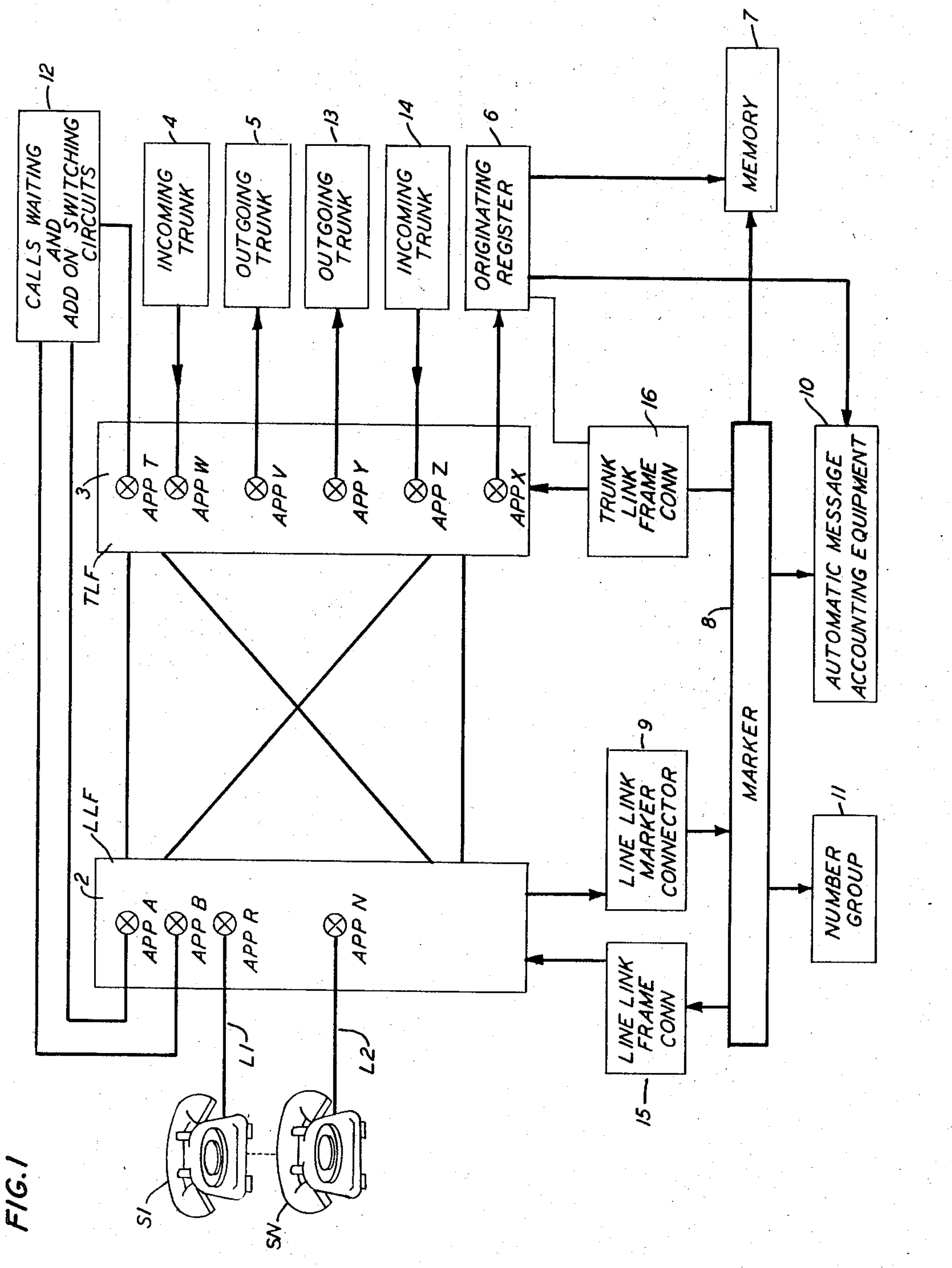
FIG. 1 is esentially a block diagram showing the interrelation of the exemplary embodiment of the invention.

It will be noted that FIGS. 2 through 9 employ a type of notation referred to as "detached-contact" in which an X, shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, volume 74, pages 505–513.

The present invention is illustrated in an automatic switching system wherein common control circuits are employed to control the establishment of calls through a switching network. One such system is disclosed in the A. J. Busch Patent 2,585,904 issued Feb. 19, 1952. It is to be understood, however, that the present invention is not limited to use in a telephone system of this type but may be utilized in other types of switching systems.

INTRODUCTION

The invention is described herein as being embodied in a telephone system of the type disclosed in the cited Busch patent. The invention is particularly concerned with apparatus in marker circuit 8 which is represented by the block shown with heavy lines in FIG. 1. The other equipment units of the Busch system are neither shown nor described in detail herein except where necessary for a complete understanding of the invention. The cited Busch patent may be consulted for a complete understanding of the construction and operation of other components of the Busch disclosure.

For purpose of illustration it is intended that the apparatus of line link frame 2, trunk link frame 3, incoming trunks 4 and 14, outgoing trunks 5 and 13, originating register 6, line link marker connector 9, line link frame connector 15, number group 11, and marker 8 be similar to the corresponding apparatus disclosed in the Busch patent. It is also intended that the apparatus shown in calls-waiting and add-on switching circuit 12 and the manner in which this circuit is employed in the embodiment be substantially identical to that which is set forth in application Ser. No. 415,319, now Patent 3,377,433, issued Apr. 9, 1968 to Wiley Whitney, and that the apparatus of automatic message accounting equipment 10 be substantially identical to that which is disclosed in Patent No. 2,599,358, issued June 3, 1952 to H. D. Cahill et al. It is further intended that memory circuit 7 shall constitute any one of a number of configurations well known in the art operable to electrically record information in binary form at preselected address locations, each of which address locations is effective to provide the information stored therein on a nondestructive read-out basis.

The interrelation and function of equipment units of the exemplary embodiment will now be described with reference to FIG. 1 wherein the interconnection between circuit blocks has been designated by arrows to indicate the direction of circuit action.

Prior to commencing the general description, it is believed that a more complete understanding of applicants' invention will be facilitated by a brief discussion of certain of the components shown in FIG. 1. As is well known in the art, each subscriber station, such as S1, has a predetermined line appearance, such as appearance R, within the switching system. As discussed hereinbefore, each such station receives a specific preassigned class of service treatment. The class of service information of the station is made available to the common control equipment (i.e., marker 8) in coded form and thereafter controls and determines the particular manner in which calling (originating and terminating) connections involving that station are processed.

As set forth earlier, it is intended that the following text will disclose the manner in which a subscriber at station S1 is permitted to vary the preassigned class of service of station S1 by selecting an arbitrary class of service required for an arbitrary interval of time. In order to simplify the desciption of the illustrative embodiment, only one such class of service change will be described. Thus, the following text will describe the manner in which a station prearranged for single-line residential service may at the subscriber's discretion and under control of the subset at the station be provided with the calls-waiting and add-on special service features (see Krom patent supra).

As is well known in the art, each of the aforesaid features requires a dual line appearance for the associated station. However, as set forth in the earlier recited Whitney disclosure, stations entitled to these special services may be provided with a dual line appearance only during the activated state of the station. Accordingly, when a station which is entitled to these services originates or terminates a telephone connection, the common control equipment is arranged to serially insert within the linkage connection involving that station an available calls-waiting and add-on switching circuit, such as the circuit designated 12 in FIG. 1.

Thus, for example, assuming momentarily that station S1 were preassigned a class of service requiring the provision of the calls-waiting and add-on features, then, upon an off-hook condition of station S1, marker circuit 8 is arranged to establish a linkage connection from line appearance R on line link frame 2 to appearance T of switching circuit 12 on trunk link frame 3 and to thereupon record the association of line appearance R and switching circuit 12 in memory for subsequent use.

As set forth more fully in the Whitney teaching, station S1 is thereby provided with a dual appearance, namely, appearance A and appearance B of switching circuit 12 on line link frame 2. These appearances may thereafter be utilized to employ the respective calls-waiting and add-on features. As also set forth in detail in the Whitney disclosure, when a call from an incoming (or intraoffice) trunk is directed to a privileged station (which we have assumed to be station S1), the calling linkage is extended from the incoming trunk appearance, such as appearance W to an available switching circuit appearance, such as appearance A, on line link frame 2 and thence through switching circuit 12, its appearance T on trunk frame 3, and via a conventional linkage connection from appearance T to line appearance R of station S1 on line link frame 2. In summary, as more fully disclosed in the Krom patent and the Whitney disclosure, it may be stated that the serial insertion of switching circuit 12 renders the calls-waiting and add-on features available to a privileged station.

In the text which is to follow herein, it will be assumed that station S1 is preassigned a class of service known as single station residential. It will be further assumed that this class of service excludes the provision of the calls-waiting and add-on features. It is further intended that the subsequent text will reveal the manner in which station S1 may arbitrarily select the class of service which insures the provision of the calls-waiting and add-on features and thereby render these features available to the station for an interval of time arbitrarily selected by the station.

GENERAL DESCRIPTION

For purpose of the general description, we shall assume that the subscriber at station S1 anticipates a need to utilize the calls-waiting and add-on class of service for a period of approximately eight hours. Obviously, in the absence of a change in the class of service designation of station S1, these features remain unavailable to that station. Accordingly, upon an off-hook condition of station S1, an idle originating register, such as originating register 6, is connected to station S1 via a linkage connection which extends from line appearance R on line link frame 2 to appearance X on trunk link frame 3. The aforesaid linkage path constitutes a dial tone connection and is established under control of marker circuit 8, based in part upon information received from line link marker connector 9 and line link frame connector 15, which provide the calling station identity of the recently activated station and also the class of service of that station. The preassigned class of service of station S1 indicates to marker 8 that when station S1 is placed in an off-hook condition in preparation for an originating call, an originating register is to be connected directly via a linkage path between appearance R on line link frame 2 and the appearance of a register on a trunk link frame in order that the register may receive the digital information which will be transmitted from the station.

In the instant arrangement, marker circuit 8 is further arranged, as will be more apparent from that which is contained hereinafter, to employ the equipment location information of station S1 as an address in interrogating memory circuit 7 to ascertain whether or not class of service change information has previously been recorded therein. Since we have assumed that station S1 has not previously selected a different class of service, the information returned to marker circuit 8 will indicate that the call should be treated in accordance with the preassigned class of service information received from line link frame connector 15. Accordingly, a dial tone connection is established via the aforedescribed linkage path.

At this point we shall further assume that station S1 has knowledge of a series of classes of service each respectively identified by a unique two digit code. We shall also assume that the code "26" identifies the class of service which provides the calls-waiting and add-on features. Thus, upon receipt of dial tone from originating register 6 in the well-known manner, the subscriber at station S1 dials (or key pulses) the digits 26 into the register. As will be more apparent from that which is contained hereinafter, originating register 6 is arranged to seize memory circuit 7 a predetermined interval of time after the registration of a two digit code.

At this point it is to be noted that marker circuit 8 has released from the connection. However, as set forth in the Busch patent, marker circuit 8 causes the registration in originating register 6 of the calling line equipment location of station S1, prior to releasing. This information is employed by originating register 6 as an address to provide access to a specific physical location within memory circuit 7. At this particular physical location, the transmitted digits 2 and 6 are stored n memory under control of originating register 6. Originating register 6 also concurrently transmits to automatic message accounting equipment circuit 10 the aforesaid line location information and the newly selected class of service designation in a manner well known in the art (see the earlier cited Cahill et al. patent). The register then releases both memory circuit 7 and automatic message accounting equipment circuit 10. As will be more apparent from that which is contained hereinafter, originating register 6 is arranged to release at this time. We shall now assume for purposes of simplicity that the subscriber at station S1 returns the subset to an on-hook condition at this time.

Upon a subsequent off-hook condition of station S1, line link marker connector 9 and line link frame connector 15 function in a manner identical to that set forth hereinbefore. Thus, an available marker, such as marker 8, is selected and the equipment location of station S1 and the preassigned class of service information for that station are forwarded to that circuit. As also earlier described, the market is arranged to interrogate the memory at this time. In interrogating the memory, marker circuit 8 employs the equipment location information of station S1 as an address. As noted earlier, at the address location of station S1, the class of service code 26 has been recorded. Accordingly, this information is read from the memory and is registered in the marker. The marker thereupon inhibits the class of service information previously received from line link frame connector 15 and substitutes in its place the class of service information read from memory circuit 7.

Deviating momentarily, it will be recognized from the details, which are contained hereinafter, that the marker may, in fact, be arranged to utilize the new class of service designation as an instruction to extend the preassigned class of service rather than to substitute therefor; i.e., the basic class of service indication may be arranged to provide ringing combination, PBX restriction, etc.; information which could, in fact, be retained with the new class of service indication constituting a variable class of service modification to provide additional features.

The call then progresses in accordance with this new class of service information. Thus, a linkage connection is established by marker 8 from line appearance R of line link frame 2 to an available switching circuit appearance, such as appearance T of switching circuit 12 on trunk line frame 3. As set forth in detail in the Whitney disclosure, prior to releasing the marker seizes memory circuit 7 and records the association of this particular line and this particular switching circuit for subsequent use. In the instant embodiment, prior to releasing marker circuit 8 is further arranged to also record the association of switching circuit 12 and the station line appearance in automatic message accounting equipment 10 for reasons that will be apparent from that which is set forth hereinafter.

The effect of the aforesaid connection is to provide a dual appearance for station S1, namely, appearance A and appearance B on line link frame 2. The marker circuit thereupon releases. The activation of switching circuit 12 results in the enabling of appearance A on line link frame 2 which causes a bid for a dial tone connection in essentially the same manner as previously described for the activation of appaerance R. Accordingly, at this juncture marker unit 8 is reseized and a linkage connection is established from appearance A to an available originating register such as originating register 6. Dial tone is returned and the subscriber at station S1 may thereupon transmit the called directory number information in the well-known manner. As set forth in detail in the Busch patent, upon the registration of a called directory number in an originating register, a marker, such as marker 8, is selected and a calling connection is established in accordance with the called number.

For purposes of the embodiment we shall assume that a calling connection is established from appearance A on line link frame 2 to appearance V of outgoing trunk 5 on trunk link frame 3 to a called station (not shown) in a manner set forth in the Busch patent. The marker circuit releases and conversation may thereupon ensue in the well-known manner.

We shall now further assume that the subscriber at station S1 desires to exercise the add-on feature by adding an additional called party to the existing connection in conference fashion. Thus, in a manner set forth in detail in the aforesaid Krom patent, the switchhook at station S1 may be flashed once. The result of this switchhook flash is to place a holding bridge across the communications path which extends from appearance A on line link frame 2 to the initially called station and further results in a dial tone bid from appearance B of switching circuit 12 on line link frame 2. In a manner identical to that hereinbefore described, a linkage connection is established from appearnace B on line link frame 2 to an idle originating register such as originating register 6 via appearance X on trunk link frame 3.

The called directory number is transmitted by station S1 upon receipt of dial tone. As earlier described, this directory number information is forwarded to marker 8 which thereupon completes a calling connection which we shall assume requires the use of outgoing trunk 13. Thus, a linkage connection is established by marker 8 from appearance B on line link frame 2 to appearance Y of outgoing trunk 13 on trunk link frame 3. We shall assume that the called station answers, and in a manner set forth in detail in the Krom patent, station S1 again flashes the switchhook to thereby cause the interconnection of station S1 and the two called stations in conference fashion thus exercising the add-on feature. Upon the completion of the conference connection, the subset at sation S1 is placed in an on-hook condition releasing the linkage connection and restorting calls-waiting and add-on switching circuit 12 to normal. A set forth in detail in the Whitney application, the association of station S1 and switching circuit 12 is erased from memory.

As will be more apparent from that which is contained in detail hereinafter, each originating call from station S1 results in the substitution of the arbitrarily selected class of service 26 for that preassigned to station S1. Thus, each originating connection will proceed exactly as hereinbefore described. Obviously the actual exercise of the add-on feature during the course of a particular connection is at the discretion of the subscriber at station S1.

Proceeding now with the general description, we shall assume that an incoming call is subsequently directed to station S1 which is presently in an on-hook condition, As set forth in detail in the earlier cited Busch patent, a conventional incoming call is manifested by the enabling of an incoming trunk, such as incoming trunk 4, to which register equipment (not shown) is automatically connected in order to receive the directory number of the called station. Upon the registration of the called number, an available marker, such as marker 8, is selected by the register equipment and the call directory number information is transmitted thereto.

As is well known in the art, it is necessary for the marker to translate the called directory number into the phyical equipment location of the called station. As set forth in the Busch patent, a series of number group translators, such as number group 11, are provided for this purpose. Thus, upon registration of the called directory number in marker 8, marker 8 seizes number group 11, and forwards the called number to that circuit. The output provided in response thereto by number group 11 is the line equipment location of the called station in terms of the line link frame identity, vertical group location, horizontal group location, and vertical file location within the line link frame.

In addition to the foregoing information, the number group also provides the class of service designation preassigned to the called station. The marker registers this information, and in the instant embodiment is arranged to thereupon interrogate memory circuit 7 utilizing the called-line location information as an address.

If we assume that station S1 has not selected a class of service other than that preassigned, the information received from memory circuit 7 will not affect the class of service designation registered in the marker. Therefore, the marker will establish a conventional single, residential line linkage connection from appearance W of incoming trunk 4 on trunk link frame 3 to appearance R of station S1 on line link frame 2. Ringing will be applied and, upon answer by the called station, conversation may ensue in the well-known manner.

However, for purpose of the embodiment, we have assumed that station S1 has previously selected class of service 26 and has recorded this information in memory circuit 7. Therefore, when marker 8 interrogates memory circuit 7, it reads out the aforesaid information. As will be more apparent from that which is contained hereinafter, marker 8 thereupon inhibits the class of service designation received from number group 11, and substitutes therefor the information read from the memory. The effect of the foregoing is to cause the marker to establish a terminating connection in the same manner as it would for any station served by the switching system which has the class of service 26 preassigned thereto. Thus, a terminating connection from incoming trunk 4 to station S1 is completed in a manner identical to that set forth in the earlier cited Whitney application which may be summarized as follows.

An idle calls-waiting and add-on switching circuit, such as switching circuit 12, is seleted and serially inserted between the incoming trunk and the called line via a linkage connection which extends from appearance W of incoming trunk 4 on trunk line frame 3, via appearance A of switching circuit 12 on line link frame 2, through switching circuit 12, and via appearance T of switching circuit 12 on trunk link frame 3 to appearance R of station S1 on line link frame 2. As further set forth in the Whitney disclosure, the association of this particular switching circuit and the particular called station S1 is thereupon recorded in memory circuit 7 for subsequent use by the common control equipment. Ringing is thereupon applied in the well-known manner and, assuming an answer by the subscriber on station S1, conversations may ensue.

We shall assume at this time that a subsequent incoming call is directed to station S1 incoming trunk 14 which appears at appearance Z on trunk link frame 3. In a manner identical to that set forth above, the called line directory number is transmitted to the marker, which as earlier described, selects number group 11. As also earlier set forth, number group 11 translates the called directory number into the physical equipment location information of the called station and also identifies its preassigned class of service. Memory circuit 7 is thereupon interrogated and, in response thereto, the marker is informed that station S1 has selected class of service 26 which provides the calls-waiting and add-on features. The marker thereupon functions in a manner identical to that set forth in the earlier cited Whitney application. Thus, the memory is interrogated to ascertain whether or not station S1 presently has a switching circuit associated therewith.

In view of the prior recording of the association of switching circuit 12 and station S1, the marker is informed that switching circuit 12 is presently serially inserted in an existing connection involving station S1. Accordingly, the marker employs the equipment location of appearance B of switching circuit 12 on line link frame 2 and establishes a linkage path from appearance Z of incoming trunk 14 on trunk link frame 3 to appearance B on line link frame 2. As set forth in the Whitney disclosure, a momentary tone is impressed upon the previously described connection path extending from station S1 to incoming trunk 4 to alert the subscriber at station S1 to the existence of a waiting call. As further set forth in the Whitney disclosure, the subscriber at station S1 may cause immediate connection to the subsequent calling station by a single switchhook flash and may return to the initial connection by repeating the same action.

For the purposes of this embodiment, we shall assume that station S1 has completed the initial conversation and thereupon flashes the switchhook so as to be connected to the subsequent calling station, and upon completion of the conversation places the subset at station S1 in an on-hook condition thereby releasing the associated equipment which includes switching circuit 12. As set forth in the Whitney dislosure, the release of switching circuit 12, causes the erasure of the information in connection therewith previously stored in memory, thus rendering switching circuit 12 available for association with other calling connections.

In view of our initial assumption that class of service 26 was required for an eight hour time period, we shall assume at this point that the time has transpired and that the subscriber at station S1 desires to return to the original class of service preassigned to that station.

Accordingly, upon an off-hook condition of station S1, a dial tone connection, in accordance with class of service 26, is once again established. Thus, an available switching circuit, such as switching circuit 12, is serially inserted between line appearance R of station S1 and an originating register appearance, such as appearance X on trunk link frame 3. As earlier set forth, the linkage path extends from appearance R of station S1 to appearance T of switching circuit 12, and from appearance A of switching circuit 12 to appearance X of originating register 6. At this time in response to dial tone, the subscriber transmits the digits "00" as a coded signal that the previously registered class of service information is to be inhibited or negated. As earlier set forth, originating register 6 is arranged to respond to a two-digit code and a predetermined interval of time by selecting memory circuit 7, and to cause the writing therein of the code registered in the originating register.

It will be noted that upon establishing the connection between the line appearance A of the switching circuit and the register, the marker forwards to originating register 6 the line location information of line appearance A on line link frame 2 as set forth in the Busch patent. Thus, with regard to the writing of the erase code in memory circuit 7, the register does not presently have the line equipment location information of station S1 available as an address. However, for reasons which will be apparent hereinafter, it will be further noted that memory circuit 7 presently has located therein the association of appearance R of station S1 and the A appearance of switching circuit 12 as earlier set forth. Thus, in response to the generation of code "00" by station S1, register 6 utilizes the equipment location information of line appearance A as an address in memory. In response thereto, memory circuit 7 is arranged to read out from this location in the memory the line location information of station S1 in a manner similar to that set forth in the Whitney application. The line location information for station S1 is thereupon used by the memory as an address for writing in the newly received code thus effectively replacing the previously recorded digit 26 at this address with the digits "00." It will be obvious that, although in the instant embodiment the initial read out from memory during the erase function constitutes an instruction to cause the writing of the new code at a different location, in fact, only the initial addressing function would be necessary where the originating station is not connected through a line appearance to a register which line appearance is different than that preassigned to the associated station.

Originating register 6 thereupon releases, but prior thereto forwards to automatic message accounting equipment circuit 10, the equipment location information of appearance A of switching circuit 12 and also the recently transmitted code "00" in a manner identical to that set forth hereinbefore. It will be obvious that code "00" thus provides an indication to the billing equipment of the cessation of the use of the previously selected class of service. In view of the former recording in automatic message accounting equipment 10 of the association of the switching circuit 12 appearance A and the station S1 line appearance, the message accounting equipment correlates the former entry with the most recent entry so as to render a billing charge to station S1 only for the interval of time in which the class of service charge was effective. We shall assume that station S1 thereupon returns to an on-hook condition.

It will be apparent from the foregoing and more apparent from the details contained hereinafter, that on subsequent calls involving station S1, upon interrogation of memory circuit 7, marker 8 will receive in the form of the code "00" an indication that the class of service treatment which station S1 is to receive is the class of service which has been preassigned to that station.

It is obvious from the foregoing that station S1 may, at any future time, arbitrarily select the aforesaid or another class of service for any arbitrarily selected interval of time. In each such instance, the manner in which the class of service selected is recorded in memory and also its subsequent erasure, will be as hereinbefore set forth. Obviously, the manner in which the specific calling connections involving station S1 are thereafter processed will be in accordance with the specific class of service treatment selected by the station.

DETAILED DESCRIPTION

The following text will describe the embodiment of our invention in detail with reference to FIGS. 2 through 9. A cursory examination of these figures will reveal that certain relay contacts and relay designations have been enclosed in parentheses. The parenthetical symbol has been employed to facilitate a clear understanding of applicants' invention by indicating that the apparatus which is enclosed therein is shown more fully in the earlier cited Busch or Whitney disclosures. Relay designations and contact designations which are unique to the instant embodiment are not enclosed in parentheses and, as will be more apparent from that which is contained hereinafter, are shown in complete detail.

We shall assume, as hereinbefore set forth, that station S1 is arranged for conventional single line residential service. We shall further assume that the corresponding class of service designation is class of service 29. It will thus be obvious, as set forth in the Busch patent, that during the establishment of an originating or terminating connection involving station S1, marker circuit 8 will ascertain the class of service of station S1 to be that designated 29 and, therefore, will function in accordance with that class of service in processing such connections. In the immediately following detailed description, we shall assume that station S1 desires to change the class of service from class of service 29 to class of service 26; the latter class of service providing the add-on and calls-waiting features as hereinbefore set forth.

Thus, upon an off-hook condition of the subset at station S1, marker circuit 8 is seized by line link marker connector 9 in a manner identical to that set forth in detail in the earlier cited Busch patent. Since marker circuit 8 is seized by line link marker connector 9 only in conjunction with a dial tone request, marker circuit 8 prepares to obtain that information necessary for the completion of a dial tone connection.

Figure 2:
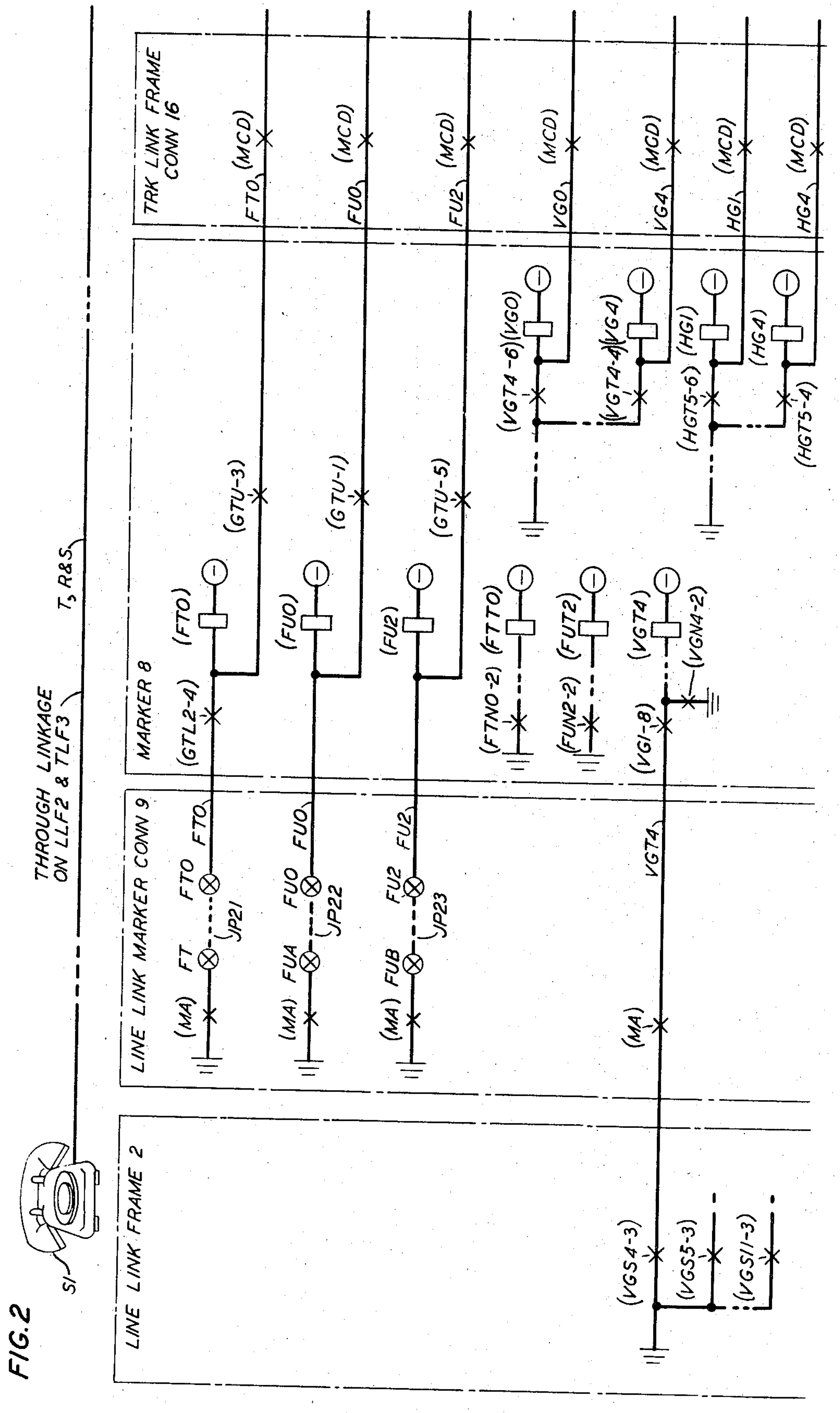
FIGS. 2 through 9 are schematic drawings showing in greater detail the interrelation of the components of the exemplary embodiment.
Figure 3:
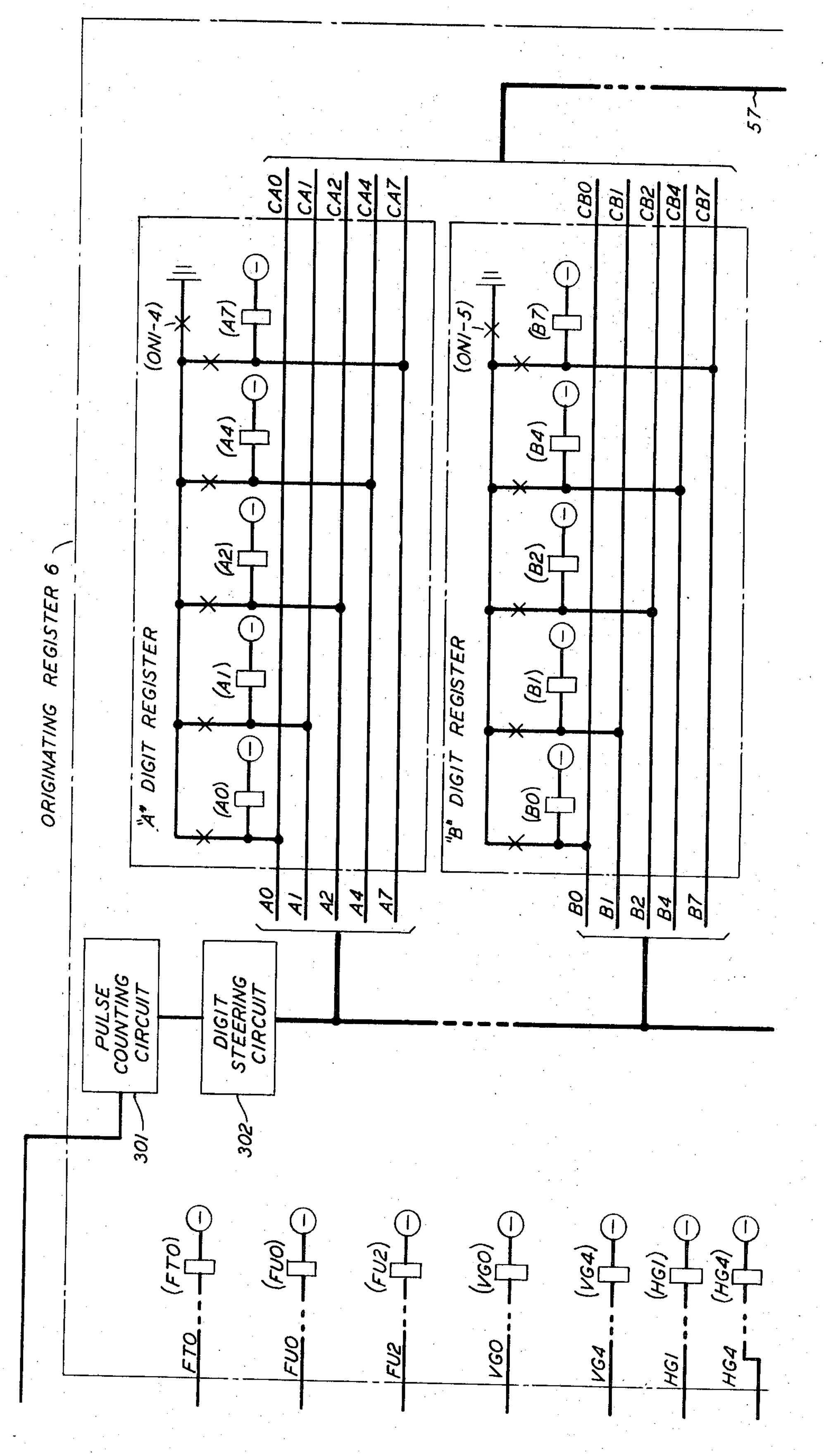
Figure 4:
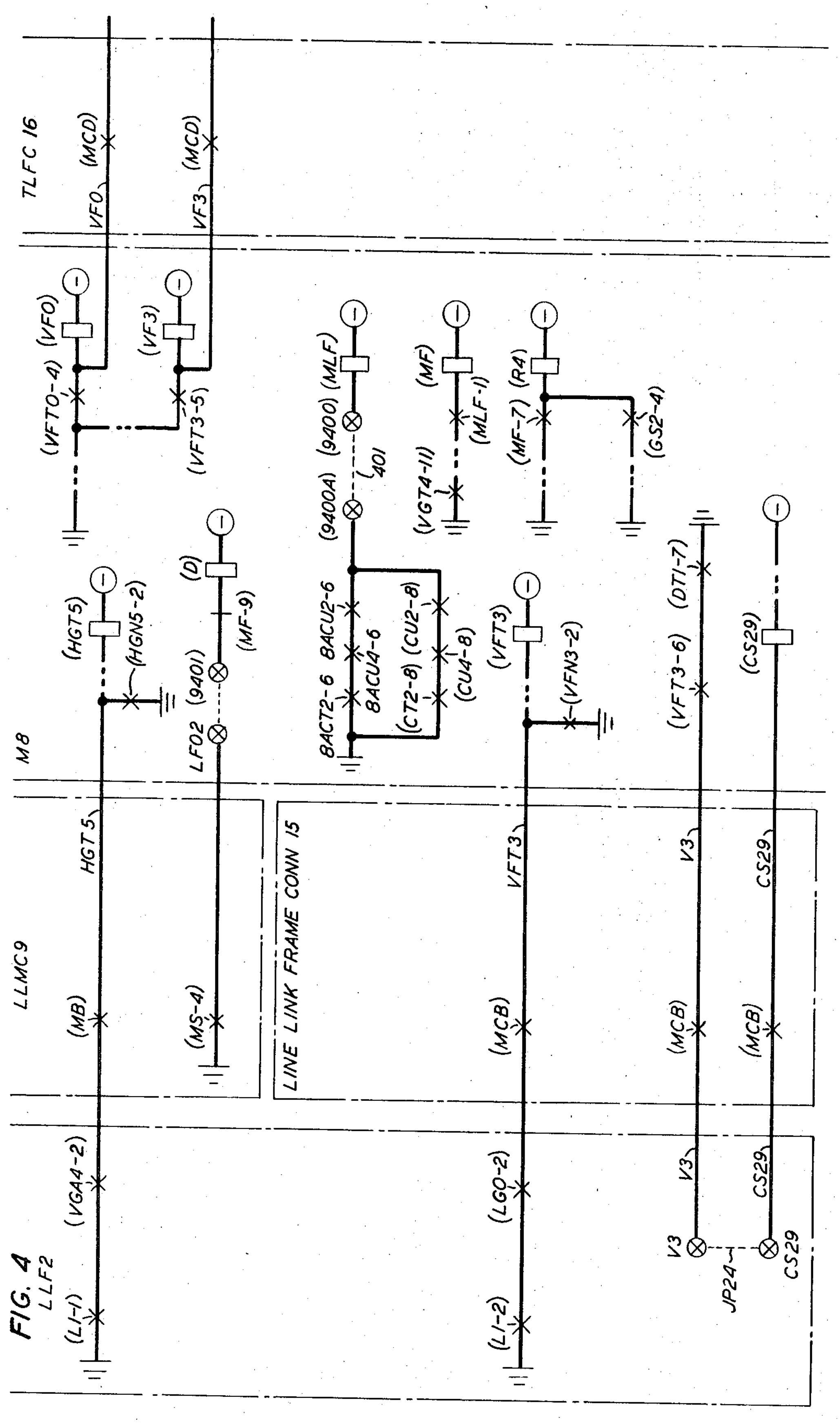

Referring now to FIGS. 2 and 4, line link marker connector 9 extends various line location information leads to marker circuit 8 to permit registration of the information which identifies the location of the calling line. Accordingly, relay (FT0) in marker circuit 8 operates by an obvious circuit which extends via the (FT0) lead to ground in line link marker connector 9, thus, recording a line link frame tens digit of 0. In similar fashion, relays (FU0) and (FU2) (frame units digit) operate from ground extended to the marker from line link marker connector 9 thereby establishing that the origin of the connection is from a station located on line link frame 2.

In similar fashion, operated contacts on the(MA) relay in line link marker connector 9 extend ground on the (VGT4) lead to marker circuit 8 to operate relay (VGT4), thereby identifying the vertical group location of the calling station as vertical group 4. Similarly, ground extended on the (HGT5) lead from line link marker connector 9 identifies the station as being located in horizontal group 5 thus operating relay (HGT5). Concurrently therewith, the enabling of the marker start relay make contact (MS–4) extends ground from line link marker connector 9 to the (LF0) punching in marker circuit 8 to cause the operation of relay (D) by an obvious circuit. As discussed in detail hereinafter, relay (D) indicates a request for the completion of a conventional dial tone connection.

Deviating momentarily, it will be noted that relay (MLF) in FIG. 4 does not operate at this time since its operation depends upon the enabling of contacts which indicate a class of service designated class of service 26 as will be more aparent from that which is contained hereinafter.

As set forth in the A. J. Busch patent, upon receiving the aforesaid information, marker circuit 8 seizes line link frame 2 via the associated line link frame connector which we shall assume to be line link frame connector 15 as shown on FIG. 4. After the aforesaid extends those leads from line link frame 2 which are necessary to provide the vertical file location information of the calling station and also its preassigned class of service. Accordingly, at this time relay (VFT3) operates in marker circuit 8 from negative battery extended through the winding of the (VFT3) relay via the (VFT3) lead to line link frame connector 15, enabled connector relay (MCB), and through enabled make contacts (LG0–2) and (L1–2) to ground in line link frame 2.

As earlier noted, station S1 is preassigned class of service 29. Thus, the (CS29) relay operates in marker circuit 8 from negative battery extended through the (CS29) relay winding and via the correspondingly designated lead to line link frame connector 15, enabled make contact (MCB) to the (CS29) punching in line link frame 2 via jumper 24 to the V3 punching, and via the V3 lead through enabled make contacts of the (MCB) connector relay in line link frame connector 15, via the V3 lead to marker 8 and through enabled make contacts (VFT3–6) and (DT1–7) to ground.

Summarizing at this time, upon an off-hook condition of the subset at station S1, line link marker connector 9 has enabled marker circuit 8 which, in turn, has seized line link frame 2 via line link frame connector 15. Information identifying the line link frame, vertical group, horizontal group and vertical file has been recorded in marker circuit 8. In addition, relay (CS29) has operated in marker circuit 8 to identify the originating station as a station entitled to single line residential service. In this regard, an examination of the earlier cited Busch patent will reveal that the aforesaid circuit operation is identical to that set forth therein. However, in the instant embodiment, the marker is arranged to interrogate the memory at this time to ascertain whether or not there has been a class of service change by station S1. The manner in which this is accomplished will now be described.

Figure 9:
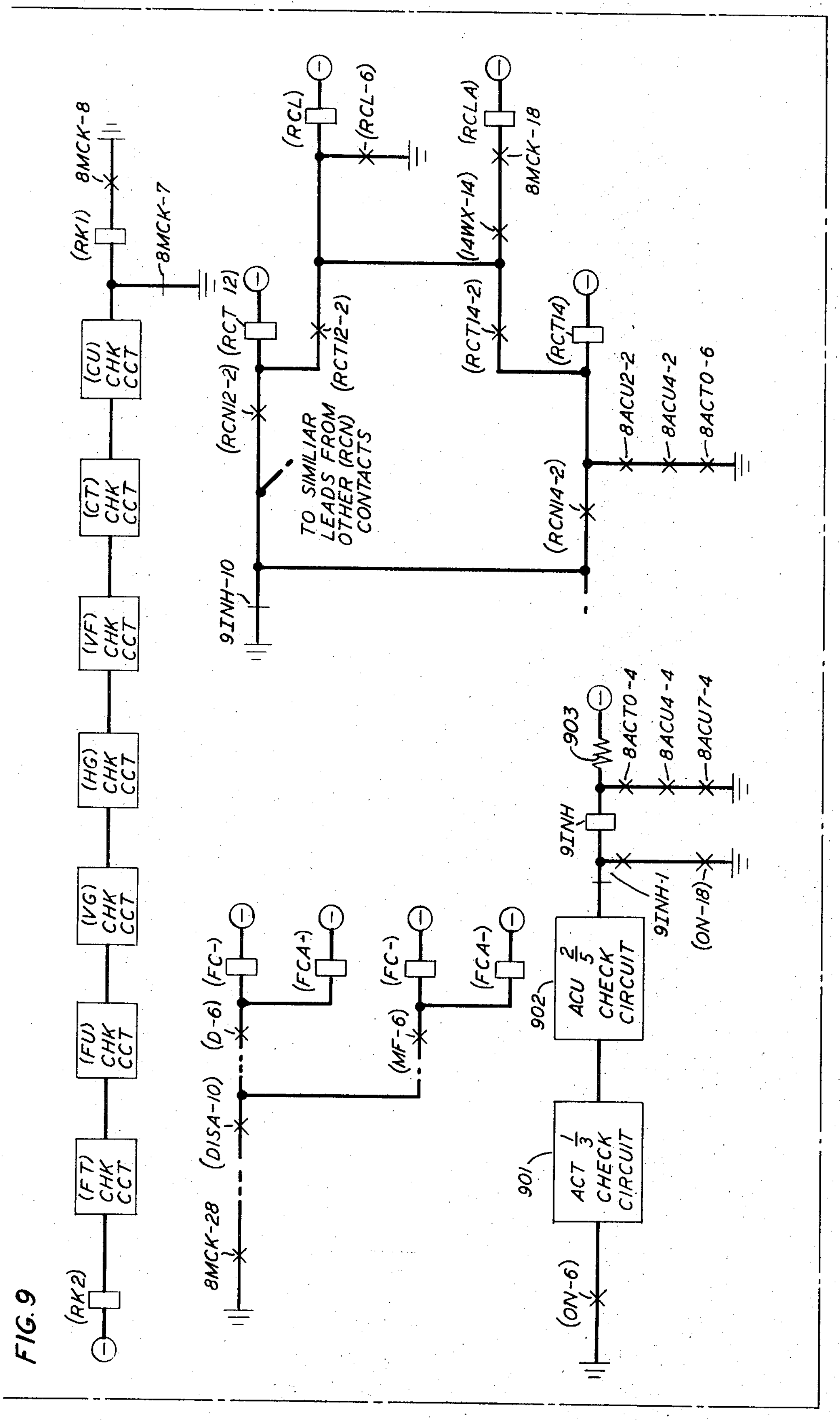

As shown on FIG. 9 and as more fully described in the Busch patent, relay (RK2) operates at this time to indicate that the aforesaid line equipment location information and class of service information has been obtained. Thus, relay (RK2) operates by an obvious circuit through the various check circuits to ground present on released break contact 8MCK–7. It will be noted that relay (RK1), however, does not operate at this time because of the shunting effect of the aforesaid 8MCK–7 break contact.

Figure 8:
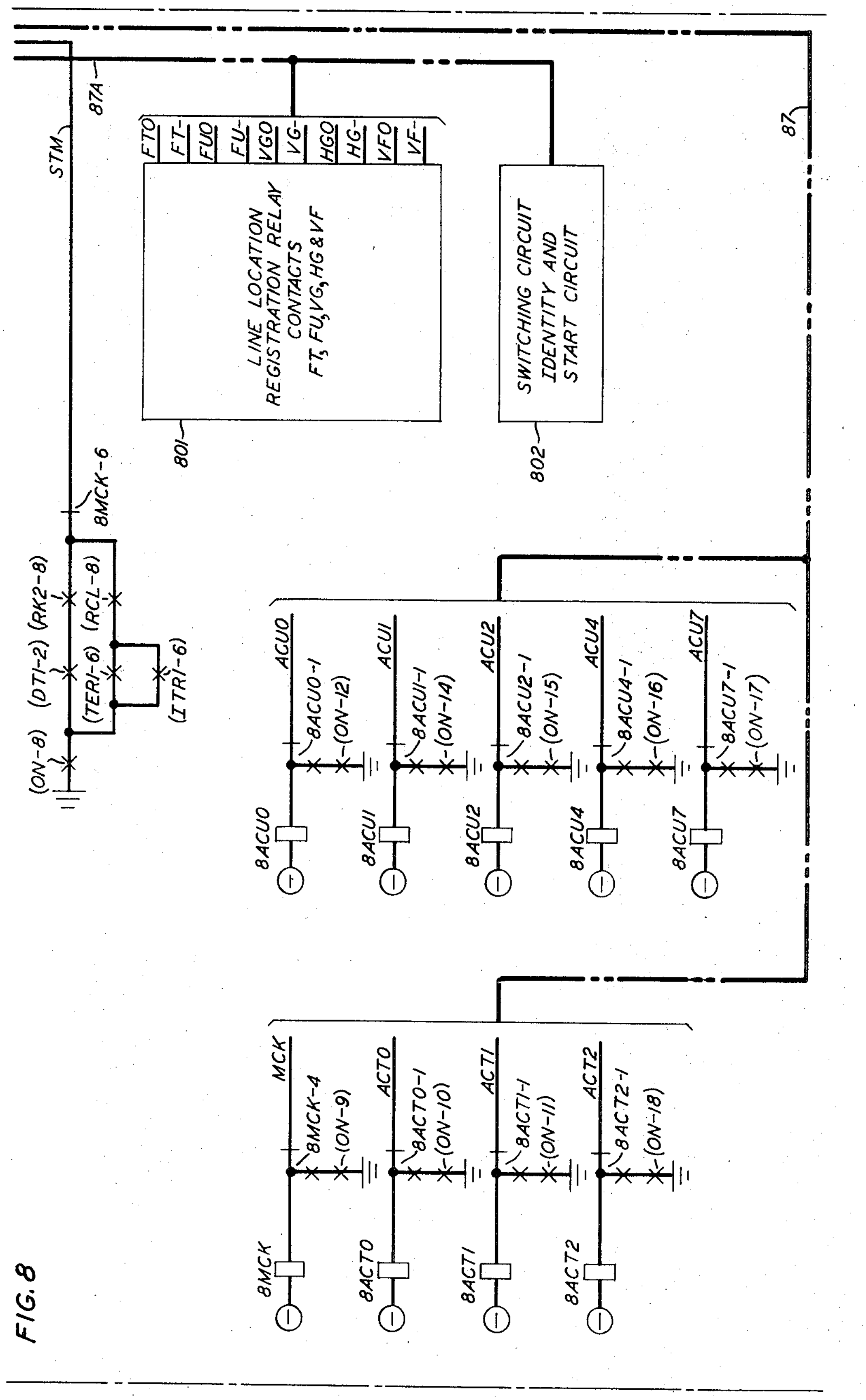

As noted earlier, it is intended that memory circuit 7 may comprise any one of a number of configurations of memory circuits well known in the art which is operable to electrically store information at a particular address location, which information may be obtained subsequently from that address location on a nondestructive read out basis. Referring now to FIG. 8, ground is extended at this time from marker circuit 8 to lead STM via enabled make contacts (ON–8), (DT1–2) and (RK2–8) and through released break contact 8MCK–6, to enable address register 701 via the STAR lead and access circuitry 702 via the STAC lead in the well-known manner. The aforesaid ground potential on the STM lead is advantageously arranged to indicate a read function to memory circuit 7. The address information required to perform the read function is transmitted on the (FT–), (FU–), (VG–), (HG–), and (VF–) leads to memory circuit 7 from a configuration on the correspondingly designated relay contacts in line location registration relay contacts circuit block 801 in marker 8.

From the earlier recited description, it will, of course, be obvious that the particular leads which are enabled at this time to identify the location of the station involved will be the leads designated, respectively, FT0, FU0, FU2, VG0, VG4, HG1, HG4, VF1, and VF2. The foregoing thus identify a bid for information regarding station S1 which is located on line link frame 2, vertical group 4, horizontal group 5 and the vertical file 3 as hereinbefore set forth.

Thus, as shown in block form in address register 701, an address comprising the aforesaid digital information, namely 02453, is utilized by access circuitry 702 to interrogate the corresponding location within memory unit 703 so as to ascertain the specific class of service designation stored therein.

We have assumed that there has not been any prior activation or change of class of service for this particular station, thus for reasons which will be apparent hereinafter the digits 00 will be read from memory and transmitted through output register 704 and via output gates 705 and cable 87 to the ACT– and ACU– leads to marker circuit 8. The aforesaid leads indicate the particular class of service, if any, recorded in memory and results in the operation of one of the 8ACT0, 8ACT1 or 8ACT2 relays to indicate the tens digit information of the class of service. In similar fashion, two of the five relays designated 8ACU0, 8ACU1, 8ACU2, 8ACU4 and 8ACU7 are similarly enabled to identify the units digit of the class of service on the well-known two-out-of-five basis. Since we have assumed that the class of service designation stored in the aforesaid address location is 00, then ground will be extended from output gates circuit 705 in memory circuit 7 to the ACT0 lead, the ACU4 lead, and the ACU7 lead to cause the operation of the corresponding relays in marker circuit 8 at FIG. 8 at this time thereby providing an indication to marker 8 of the information stored in memory. The aforesaid 00 indication indicates to the marker that no class of service change has been effected for station S1. For reasons which will be apparent subsequently, enabled make contacts 8ACT0–4, 8ACU4–4, and 8ACU7–4 impress a shunting ground potential on the right-hand side of relay 9INH to prevent its operation at this time.

Concurrent with the reception of the aforesaid code, which had been stored in memory at the station S1 address location, a potential is extended from output gates circuit 705, cable 87 and via the MCK lead to marker circuit 8 to cause the operation of relay 8MCK by an obvious circuit. Relay 8MCK locks operated through enabled transfer contacts 8MCK–4 and (ON–9) to ground. The operation of relay 8MCK indicates to the marker that the interrogation of memory circuit 7 has been completed. Accordingly, the operated condition of break contact 8MCK–7 and make contact 8MCK–8 thereby permits the operation of relay (RK1) at this time to provide a check indication to the marker in the manner set forth in the Busch patent that all line location information and class of service information is now complete. Concurrent therewith, as shown in FIG. 9 ground is extended through enabled make contacts 8MCK–28, (DISA–10), and (D–6) to cause the operation of relays (FC–) and (FCA–) which are associated with trunk line frames which may be utilized in the requested dial tone connection. Thus, marker circuit operation proceeds in a manner identical to that set forth in the Busch patent for establishment of a dial tone connection to an originating register.

Accordingly, marker circuit 8 proceeds to test for an available originating register. For purpose of the embodiment we shall assume that the marker seizes trunk link frame 3 so as to select originating register 6 at this time. Thus, as set forth in the Busch patent, connector relay (MCD) operates in trunk link frame connector 16 (FIGS. 2 and 4) so as to accomplish the foregoing function and to extend a plurality of line location information leads and class of service indicating leads from marker circuit 8 to originating register 6. Thus, in the instant exemplary embodiment, the marker causes the operation of relays (FT0), (FU0), and (FU2) in originating register 6 to indicate the line link frame location of the calling station; and also the (VG0), (VG4), (HG1), (HG4), and (VF3) relays to indicate the specific equipment location of station S1 on line link frame 2 as earlier recited in detail. The operate path of the foregoing identification relays are set forth in detail in the earlier cited Busch patent and are also obvious from an inspection of FIGS. 2 through 5 and thus will not be repeated in the text herein.

Concurrently with the transmission of the aforesaid line location information, the class of service information of station S1 is also transmitted by the marker. Since we have assumed that station S1 is classified as one of a group of stations designated as class of service 29, relay (CT2) (class tens digit 2) and relays (CU2) and (CU7) (class units 9) will operate at this time in originating register 6, at FIG. 7, via the correspondingly designated leads which extend to the respective correspondingly designated relays in marker circuit 8.

Having recorded the aforesaid information, as well as other data pertinent to subsequent handling of the call, in originating register 6, marker 8 releases so as to be available to serve other calling connections. Prior to so releasing, marker 8 establishes a linkage connection from appearance R of station S1 on line link frame 2 to appearance X of originating register 6 on trunk link frame 3 in a manner identical to that set forth in the Busch patent. Thus, as shown on FIGS. 2 and 3, a continuous communcations path extends from the subset at station S1 through to pulse counting circuit 301 in originating register 6. Dial tone is returned jn the well-known manner to signify that the calling station may commence transmission of the necessary digital information and we shall assume that the subscriber desires at this time to select a class of service different from that which was preassigned to the associated station. We shall further assume that the subscriber has knowledge of a series of two-digit codes, each of which represent a specific class of service which may be obtained by dialing any one of such codes upon receipt of dial tone.

As earlier set forth herein, we shall assume that the subscriber at station S1 generates the digits 2 and 6 in sequence as a manifestation of a request that station S1 thereafter be provided with the calls-waiting and add-on special service features. The aforesaid two digits are counted in pulse counting circuit 301 and are extended through digit steering circuit 302 so as to be registered in the A digit register and the B digit register, respectively, in a manner identical to that set forth in the Busch patent. We shall further assume for simplicity of disclosure that the subscriber has been informed that where a two-digit code is not followed by subsequent digits within a predetermined interval of time, such as, for example, ten seconds, then the aforesaid code will be recognized as a class of service change request. We shall, therefore, assume that this interval of time transpires thus completing a circuit for the operation of relay 5T which extends from negative battery through the winding of relay 5T, released transfer contact 5T–1, released break contacts 5IH–2, through interdigital timing circuit 501 which may comprise any number of configurations well known in the art operable to provide continuity between two leads after a predetermined time interval, and through two-out-of-five check circuits 502 and 503 which consist of a configuration of operated relay contacts on two of the five relays in the A digit register and two of the five relays in the B digit register, respectively, to ground. Thus, relay 5T operates at this time and locks operated through transfer contact 5T–1 and (ON–8) to ground to thereby manifest to originating register 6 that a two-digit code has been transmitted which is to be recorded as a class of service change for the associated station.

Deviating momentarily, it will be noted that relay 5IH will be enabled in response to the operation of two-out-of-five of the registration relays in the C digit register. Were this to occur, enabled break contact 5IH–2 would thereby prevent the operation of relay 5T since the enabling of the C digit register indicates that the preceding A and B digits are not associated with a class of service change.

Figure 5:
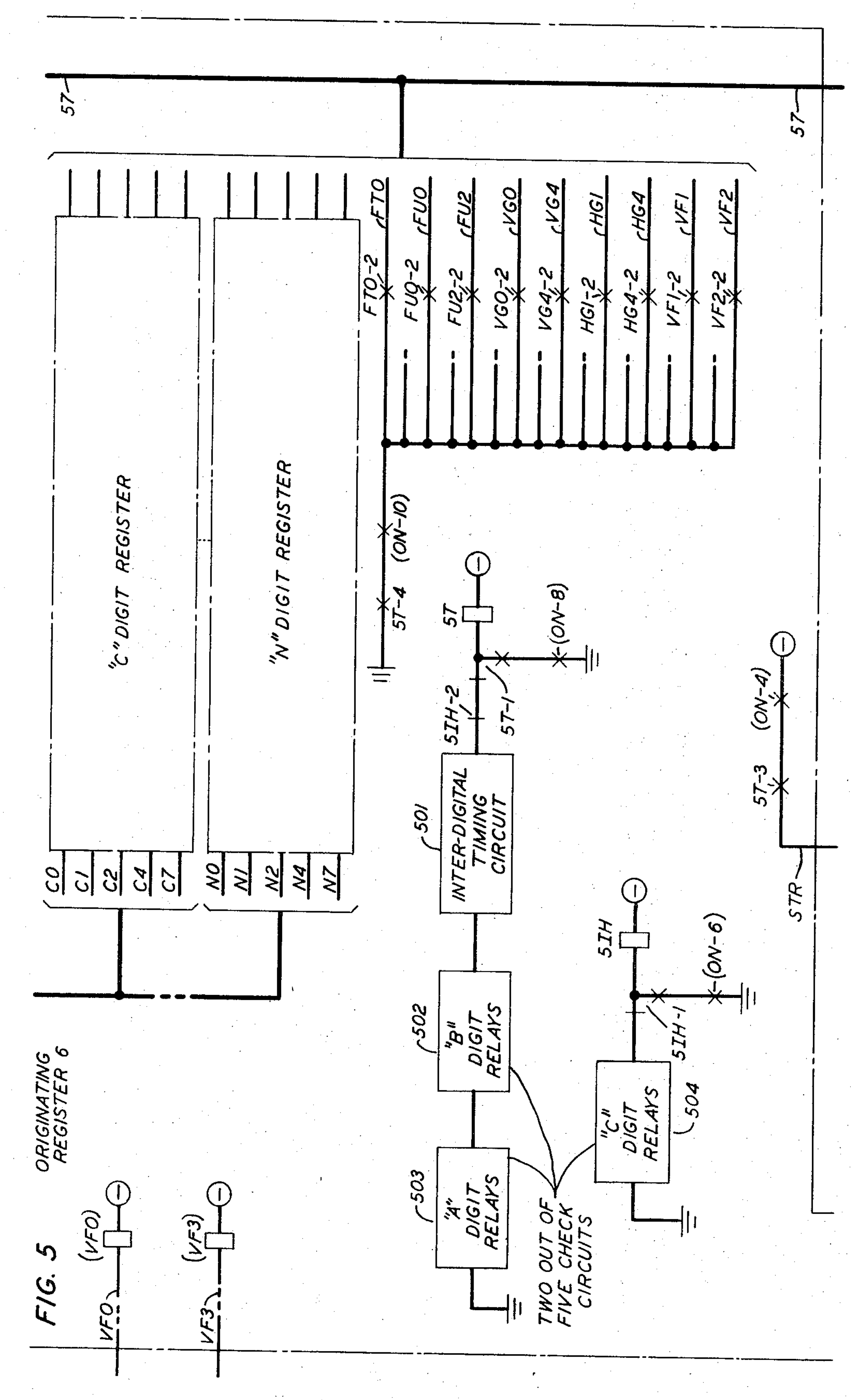

Referring to FIG. 5, the enabling of make contact 5T–3 extends battery present on enabled make contact (ON–4) via the STR lead from originating register 6 so as to enable address register 701 and access circuitry 702 via the associated STAR and STAC leads, respectively, in memory circuit 7. Thus, in a manner identical to that set forth before, memory circuit 7 is selected at this time. However, memory circuit 7 is arranged, as well known in the art, to recognize a signal originating on the STR lead as a signal to indicate the commencement of a write function. Concurrent with the enabling of the STR lead, a plurality of leads are extended via cable 57 and cable 57–87A to address register 701 in memory circuit 7. An examination of the respective designations of these leads will reveal that they constitute two basic groups of information. The first group of information is the equipment location information of station S1 (as earlier recited this information will serve as an address for a specific location in memory); and the second group of information is the newly designated code which is to be stored in memory. Thus, ground will be present on leads CA0 and CA2 which extend from the A digit register and CB2 and CB4 from the B digit register in originating register 6 as an indication in the well-known two-out-of-five manner of a code having the value 26. The memory circuit thereupon performs a write function in the well-known manner and then releases so as to be available to serve other calls in similar fashion.

Concurrently with the transmission of the aforesaid information to memory circuit 7, automatic message accounting equipment 10 is arranged to receive the same information in parallel. Thus, negative battery is extended via the STAM lead so as to cause the enabling of automatic message accounting equipment 10 to prepare this circuit to receive the line location information and newly selected class of service information via cable 57 and cable 87A from originating register 6. As set forth in the earlier cited Cahill et al. patent, a permanent record is made of this information and the time of its reception for future charging purposes.

It will be appreciated that the aforedescribed circuit action, after receipt of the transmitted digital code, takes place in an extremely brief interval of time since it is fully automatic in nature and does not depend upon any physical action on the part of the associated subscriber or maintenance personnel. We shall assume that the subscriber at station S1 now abandons the connection having recorded on the class of service change for future use. It is, of course, obvious that numerous techniques well known in the art may be employed to transmit an audible signal to station S1 to indicate the completion of the aforesaid function in accordance with the subscriber's command.

Proceeding now with the description. We shall assume that the subset at station S1 is subsequently removed from the switchhook so as to initiate an originating call. As set forth hereinbefore, since the subscriber has selected a class of service which provides the calls-waiting and add-on features, it will be necessary for the common control equipment, principally the marker, to effect the necessary connecting paths and auxiliary equipment required to provide these features. As earlier stated, the aforesaid features are rendered available by the serial insertion of a calls-waiting and add-on switching circuit in each calling connection (originating and terminating) which involves a privileged station.

When the subset is placed in an off-hook condition, marker circuit 8 recognizes the commencement of an originating connection and the need for the establishment of a dial tone connection in a manner identical to that herein before described in detail. Thus, the earlier recited circuit operations within marker 8 are repeated up to and including the reading out of information recorded in memory circuit 7 at the address location assigned to station S1. However, at this time, by virtue of the code previously transmitted and written in memory under control of the subset at station S1, the marker will not receive the digits 00 as before, but rather will receive as an output from memory circuit 7 the recently stored digits 26. Thus, at this time leads ACT2, ACU2, and ACU4, which extend from memory circuit 7 to the marker via cable 87 will be enabled resulting in the operation of the correspondingly designated relays associated therewith. Thus, relays 8ACT2, 8ACU2, and 8ACU4 are enabled and lock operated by an obvious path to ground. Relay 8MCK also operates at this time in an identical manner to that earlier described, and via enabled break contact 8MCK–6 opens the STM lead to memory circuit 7 thus releasing that circuit.

The operation of the aforesaid relays 8ACT2, 8ACU2 and 8ACU4 completes a circuit path for the enabling of relay 9INH at this time which extends from ground present on enabled make contact (ON–6) through a check circuit on operate make contacts of the ACT2 relay in check circuit 901, and the two operated 8ACU– relay contacts in check circuit 902, through released break contact 9INH–1, the winding of the 9INH relay, and resistance 903 to negative battery. Relay 9INH thereupon operates and closes a locking path through enabled transfer contact 9INH–1 and enabled make contact (ON–18) to ground.

Figure 6:
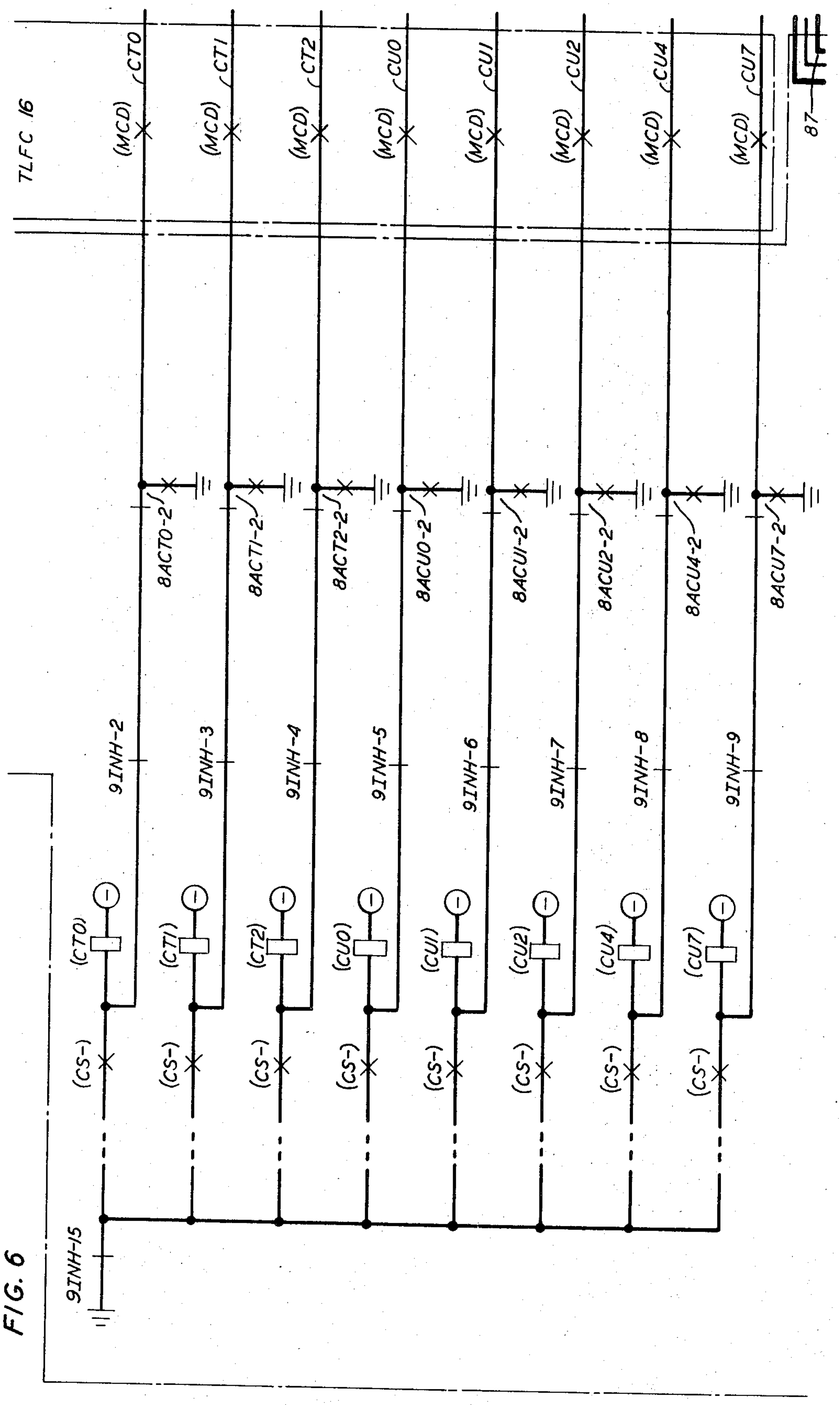
Figures 7, 10:
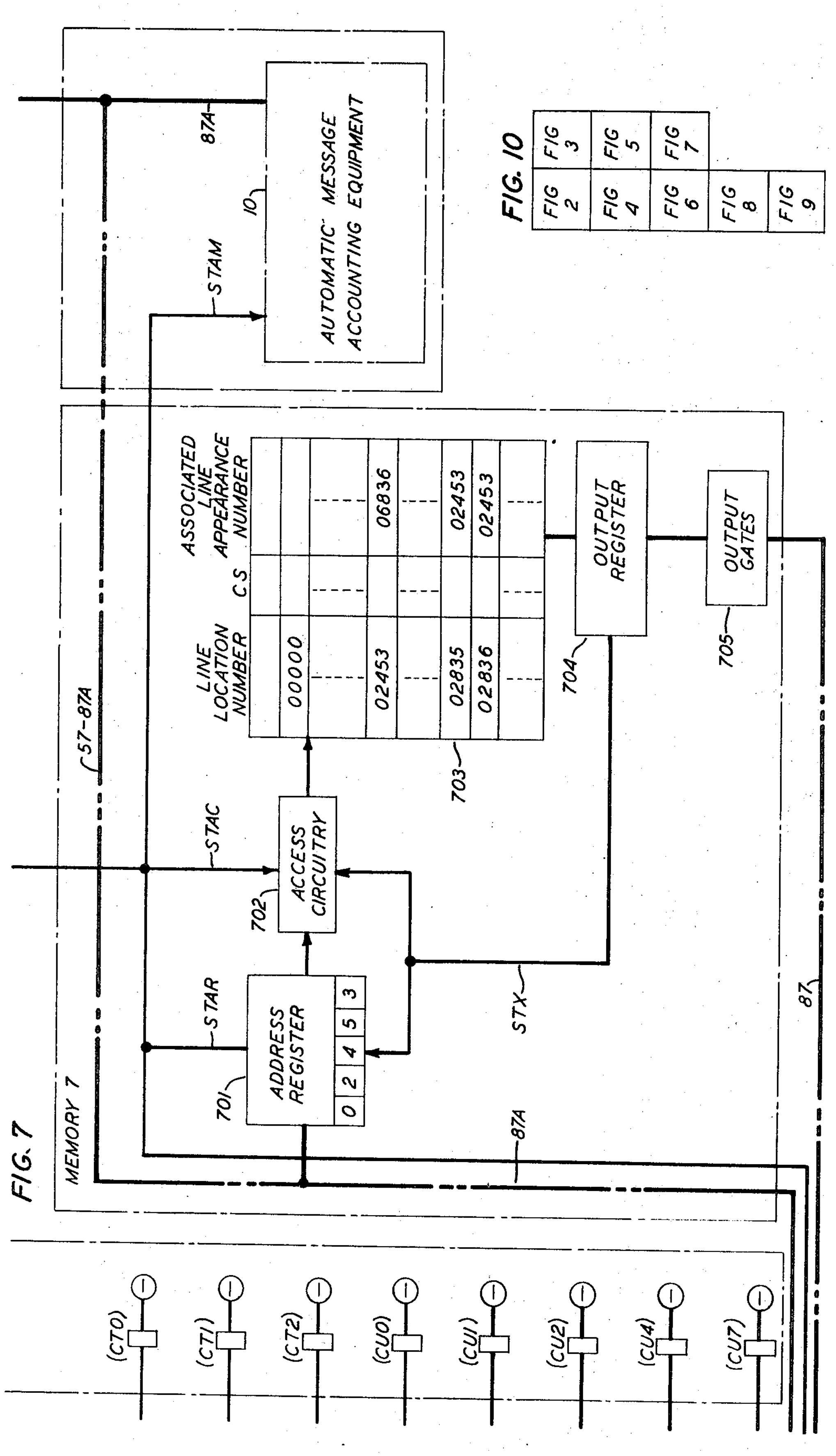
FIG. 10 shows the manner in which the other figures should be arranged.

An examination of FIG. 6 will reveal that enabled break contacts 9INH–2 through 9INH–9 interrupt the continuity of the CT0–CT2 leads and the CU0, CU1, CU2, CU4, and CU7 leads which normally extend to the left side of the correspondingly designated relay winding in marker circuit 8 and ultimately through a trunk link frame connector to a register. Thus, the aforesaid break contacts effectively inhibit the class of service information previously registered in the marker. In lieu thereof, enabled transfer contacts 8ACT–2, 8ACU2–2, and 8ACU4–2 extend ground to the correspondingly designated leads indicating a class of service identified by the digital code 26. It is thus obvious that if an originating register were to be selected at this time, the class of service information transmitted thereto by the marker would consist not of the information recorded as to the preassigned class of service, but rather would consist of the information read from memory at the address location associated with the station involved in the call.

Proceeding now with the description, as set forth in detail in the Whitney disclosure, a station entitled to the calls-waiting and add-on service will cause the operation of the (MLF) relay in marker circuit 8. It will be noted, that up to this juncture, with the exception of the memory read out function, the call has proceeded in a manner identical to that set forth in the Busch patent. Thus, at this point relay (D), FIG. 4, is in an operated state. However, relay (MLF) in FIG. 4 operates at this time by negative battery which extends through the (MLF) winding to terminal (9400) and via jumper 401 to terminal (9400A) and through operated make contacts 8ACU2–6, 8ACU4–6 and 8ACT2–6 to ground. The operation of relay (MLF) thereupon completes the obvious operate path of relay (MF) as an indication to the marker that the instant connection requires the serial insertion of a switching circuit in the associated connection. Enabled break contact (MF–9) opens the previously described operate path of relay (D) thereby releasing it. Concurrently therewith, enabled make contact (MF–7) operates route relay (R4) which, as discussed in the Whitney disclosure, indicates a route involving the use of a switching circuit.

The operation of the aforedescribed relays thereupon results in a marker performing those functions set forth in detail in the Whitney disclosure which are necessary for the completion of a connection which affords the exercise of the calls-waiting and add-on features. The manner in which this is accomplished is set forth hereinbefore and thus will not be repeated at this juncture. Thus, upon the receipt of the information from memory circuit 7, the aforedescribed operation of relay 8MCK completes the operate path of relay (RK1) in a manner earlier described and also completes the operate path of relays (FC–) and (FCA–) thus permitting the call to progress in accordance with the information presently registered in the marker.

Accordingly, as shown in FIG. 1, a linkage connection is established from appearance R of station S1 on line link frame 2 to appearance T of calls-waiting and add-on switching circuit 12 on trunk link frame 3 so as to thereby render the appearance A and the appearance B of switching circuit 12 on line link frame 2 available to station S1.

As set forth in the Whitney disclosure, prior to releasing the marker records in memory the association of the privileged station line appearance and the recently connected switching circuit dual line appearances for subsequent use by the marker for billing and call processing purposes. In this regard, switching circuit 12 is identified by its associated line appearances A and B which we shall assume are designated by the line equipment location information codes 02835 and 02836, respectively (namely, line link frame 02, vertical group 8, horizontal group 3, and vertical files 5 and 6). Therefore, in a manner similar to that set forth in the Whitney disclosure, the marker seizes memory circuit 7 and transmits to address register 701 and access circuitry 702 the line location information of station S1 and the identity of the associated switching circuit. Since this particular function is merely peripheral with respect to the instant invention, the specific manner in which it is accomplished, which may be any one of many known in the art (i.e., see Whitney disclosures), will not be set forth in detail herein. However, switching circuits identity and start circuit 802 symbolically represents the circuitry required in addition to line location registration relay contacts circuit block 801 to effect the aforesaid function. Thus, the result of the foregoing is to cause the enabling of the leads associated with the aforesaid information, which leads extend via cable 87A from marker circuit 8 and which, in turn, cause the writing in memory unit 703 of the B appearance line location identity of switching circuit 12 (viz. 02836) at a memory location addressable by the station S1 address (viz. 02453) for use during exercise of the calls-waiting feature as set forth in the Whitney disclosure; and, similarly, the enabling of these leads cause the writing in memory of the station S1 line identity information (viz. 02453) at two locations, each of which is addressable by the switching circuit A and B line identity information (viz. 02835 and 02836, respectively) for use during exercise of the add-on feature as set forth in the Whitney disclosure.

It will also be noted that the aforesaid leads which extend to memory unit 7 from marker 8 via cable 87A from line location registration relay contact circuit 801 and switching circuit identity and start circuit 802 to perform the aforesaid function are also extended to automatic message accounting equipment 10. Thus, for reasons which will be more apparent hereinafter, automatic message accounting equipment 10 records the association of the station S1 line appearance and switching circuit 12 in a manner substantialy identical to that set forth in the earlier cited Cahill et al. patent.

The marker releases at this time as set forth in the Whitney disclosure and the continuous loop which extends from station S1 through calls-waiting and add-on switching circuit 12 is extended from appearance A on line link frame 2 to cause a renewed dial tone connection request. For sake of simplicity, we shall assume that marker circuit 8, upon receiving this dial tone request in a manner identical to that described hereinbefore, thereupon processes the call in the conventional dial tone connection manner (i.e., the class of service assigned to appearance A may readily be arranged, as well known in the art, to prevent unnecessary memory seizure at this time). Thus, the net result at this point in time is the connection of station S1 through calls-waiting and add-on switching circuit 12 to an available originating register, such as originating register 6, where, as hereinbefore set forth, a directory number may be recorded for use in completing a conventional intraoffice or outgoing call. It will be noted that the aforesaid circuit action takes place without any perceptible delay in receipt of dial tone by station S1.

Referring now to FIG. 6, it will be noted that the class of service which has been arbitrarily selected by station S1 resulted in a change in the most recently described dial tone connection marker function as compared to the marker function for the previously described dial tone connection. In accordance with the exemplary embodiment, during the marker's initial association with station S1, after the new class of service code has been selected, the marker does not directly connect an originating register to the calling station. However, it will be recognized that numerous other classes of service which station S1 might select do not substantially change the initial marker circuit function, but rather would effect circuit functions which occur at some point in time after an originating register has been selected and has completed its function. Therefore, although in the example selected for purpose of the illustrative embodiment, it has not been necessary for the marker to forward to an originating register the newly selected class of service, it will be recognized that where such transfer of class of service information is necessary it would be accomplished in the following manner.

As earlier described, the enabling of break contacts 9INH–2 through 9INH–9 inhibits the class of service information which would normally be transferred to originating register 6 through the operated contacts of connector relay (MCD) in trunk link frame connector 16. In lieu of such information, operated transfer contacts on the 8ACT0, 8ACT1, 8ACT2, 8ACU0, 8ACU1, 8ACU2, 8ACU4, and 8ACU7 relays provide the information read from memory circuit 7, which information is to be substituted therefor. Upon the transfer of this information and upon completion of the balance of the marker function in connection with the originating call, as earlier set forth, the marker releases so as to be available to serve other calling connections in a similar manner.

Summarizing briefly, it wil be noted that the illustrative embodiment is arranged such that in response to the origination of a calling connection from any station served by the switching system, the marker is arranged to interrogate memory circuit 7 utilizing the address location of the associated station in order to ascertain whether or not a new class of service code has been registered therein. Where no new code exists, the marker is arranged to perform its function in accordance with the preassigned class of service of the originating station. However, where a new code is read from memory, the marker is arranged to inhibit the class of service information previously received and to substitute therefor the information read from memory which thereafter controls its function and the function of the other common control circuits which receive the class of service information from the marker.

The following text will describe the manner in which the marker processes a connection which terminates to any station served by the switching system.

For purpose of the illustrative embodiment, we shall assume that the subscriber at station S1 places the subset in an on-hook condition thus restoring the line to normal and releasing the switching circuit 12 and the information stored in connection therewith as set forth in the Whitney application. We shall further assume that an incoming call (viz. intraoffice or interoffice) is subsequently directed to station S1.

As set forth in detail in the Busch patent, the marker processes an incoming call by registering the calling line directory information. Upon so doing, the marker thereupon seizes a number group translator so as to cause this information to be translated into the physical equipment location information of the called station. We shall assume that the marker has obtained the aforesaid number group translation. Therefore, at this time the calling line location information relays associated with station S1 will be operated in marker circuit 8. The aforesaid relays operate under control of other relays enabled by the associated number group translator (FIGS. 2 and 4). Thus, relays (FTT0) and (FUT2) are operated at this time by obvious circuits to indicate that the called station is located on line link frame 2. In a similar manner, relays (VGT4), (HGT5), and (VFT3) are also operated from the number group translation in order to more precisely locate the called line station appearance in a manner hereinbefore set forth.

As described in the Whitney disclosure, the marker will concurrently receive from the number group the preassigned class of service information for the called station via an operated (RCT–) relay. As also set forth in the Whitney teaching, where the number group causes the operation of relay (RCT14), FIG. 9, the marker is thereby informed that the called station is entitled to the calls-waiting and add-on features which are provided by the serial insertion of a switching circuit in each terminating connection to that staton. For purpose of the embodiment, we shall assume that the marker has received an indication of the class of service of station S1 as manifested by the operated state of relay (RCT12) in FIG. 9 which is operated by an obvious circuit. We shall further assume that an operated (RCT12) relay indicates conventional single line residential service as earlier discussed herein.

As set forth in detail in the Busch patent and as shown on FIG. 9, the operation of an (RCT–) relay results in the operation of relay (RCL) as an indication that the information associated with relay (RCT–) has been received. In the instant embodiment, the operation of enabled make contact 6 on the (TER1) relay (indicating an incoming call) or operated make contact 6 on the (ITR1) relay (indicating an intraoffice call), and enabled make contact (ON–8) extend ground potential through released contact 8MCK–6 to the STM lead to enable memory circuit 7 in a manner identical to that earlier described for an originating call.

It will be noted, that the line location registration relays which are presently operated will provide enabling signals from the line location register relay contacts circuit 801 to memory circuit 7. Thus, memory circuit 7 scans the address location of station S1 in memory and reads out the recorded code 26 in the same manner as earlier described thereby resulting in the operation of the 8ACT0, 8ACU4, and 8ACU2 relays in the marker.

Relay 9INH thus reoperates via an earlier described operate path and locks to ground by an obvious circuit. The enabled state of break contact 9INH–10 removes the operating ground from relay (RCT12) thus restoring that relay to normal. Concurrently therewith enabled make contacts 8ACT0–6, 8ACU4–2, and 8ACU2–2 complete the operate path of relay (RCT14) as an indication to the marker that the station to which the call is to be terminated is a special service station requiring the serial insertion of a calls-waiting and add-on switching circuit as set forth in the Whitney disclosure.

Concurrent with the reception in the marker of the code identifying the selected class of service, relay 8MCK operates as an indication that the memory interrogation function has been completed. Enabled break contact 8MCK–6 thereupon interrupts the continuity of the STM lead which extends from marker 8 to memory circuit 7 thereby releasing the memory for use on other calls. Relay 8MCK remains operated by an obvious locking circuit to ground.

The enabled condition of contact 8MCK–18 partially completes the operate path of relay (RCLA), the subsequent operation of which permits the marker to continue its function in completing a terminating call as set forth in the Busch patent. However, relay (RCLA) does not operate at this time but awaits the enabling of make contact (14WX–14) which, as described in the Whitney disclosure, indicates a completion of the marker functions necessary for handling of a terminating connection involving a station arranged for calls-waiting and add-on. We shall assume that these functions take place in the manner set forth in the Whitney dislcosure thus resulting in the enabling of the aforesaid (14WX) relay, and thereupon permitting the call to proceed to completion after the serial insertion of the aforesaid switching circuit which renders the calls-waiting and add-on features available to station S1. Marker circuit 8 thereupon releases so as to be available to serve other calling connections in a similar manner.

We shall now assume that the subscriber at station S1 has utilized the aforesaid service and subsequently determines that the special service features previously selected are no longer required by that station and thus desires to deactivate the arbitrarily selected class of service and to return to the preassigned class of service status. To deactivate the selected class of service, the subscriber removes the subset at station S1 from the on-hook condition. The call proceeds identically to that set forth hereinbefore whereby a connection is completed from station S1 through to the trunk link frame appearance of an idle calls-waiting and add-on switching circuit such as switching circuit 12, and from the A appearance of the switching circuit on the line link frame through to the appearance of an originating register such as register 6 on trunk link frame 3.

In connection with the exercise of the features provided by the instant invention, we shall assume that the subscriber at station S1 has been instructed that any previously stored class of service designation may be effectively erased by the subsequent transmission of the digits 00. Accordingly, in a manner identical to that described hereinbefore for the registration of the code 26, the A digit registers and the B digit registers of FIG. 3 each, respectively, record a digit 0 in response to the transmission of these digits from the calling station. Thus, at this point relays (A4) and (A7) and relays (B4) and (B7) are enabled in originating register 6. In addition thereto, the calling line equipment location information of the originating appearance on line link frame 2 (namely apeparance A) is employed as an address in memory in the same manner as hereinbefore described for the initial writing of the code 26 by station S1.

Therefore, in an identical manner to that earlier set forth, relay 5T operates at this time and locks operated through enabled transfer contact 5T–1 and enabled make contact (ON–8) to ground. Accordingly, enabled make contact 5T–3 applies negative potential to the STR lead to memory circuit 7 to cause the selection of that circuit at this time. Concurrenly therewith enabled make contacts 5T–4 and (ON–10) enable the aforesaid address code leads in cable 57 to cause the registration in address register 701 of the line equipment location information number associated with the A appearance of switching circuit 12 (namely, 02835). The enabled CA4, CA7 leads from the A digit register and the CB4 and CB7 leads from the B digit register are also extended via cable 57 to indicate that the code 00 is to be written in memory at this time.

It will, of course, be recognized that the class of service change code 26 is to be replaced with the digits 00 at the address in memory which is associated with the station S1 line appearance. To accomplish this function, memory circuit 7 may advantageously be arranged, as well known in the art, to recognize that at the address designated 02835, the associated line appearance number 02453 has been recorded and to further recognize this as an instruction that the code 00 is to be written into the memory location associated with this latter address. Therefore, output register 704 is arranged at this time to extend this information via the cable designated STX to address register 701 and access circuitry 702 to cause memory circuit 7 to advance to the address location designated 02453 and to cause the writing therein of the digit code 00 thus effectively replacing and negating the previously recorded class of service change code 26. Upon completing its function, memory circuit 7 releases as hereinbefore set forth.

As also set forth hereinbefore, the enabling of lead STAM which extends from originating register 6 (at FIG. 5) to automatic message accounting equipment 10 causes a permanent record to be made of the dialing of an erase code from a line appearance associated with station S1. It will also be noted as earlier set forth that automatic message accounting equipment 10 has previously recorded the association of station S1 with the line appearances associated with switching circuit 12. Therefore, the use of the switching circuit 12 line appearance information as an entry for recording the transmission of the cancellation of the previously selected class of service may readily be correlated with the aforesaid previously recorded information in order to effect the proper billing.

We shall assume that upon completing the aforesaid function the subset at station S1 is returned to an on-hook condition thereby resulting in the release of switching circuit 12 and the information associated therewith previously recorded in memory circuit 7 in a manner set forth in the Whitney disclosure. In view of the writing of the code 00 at address 02453 in memory circuit 7, it will also be obvious that until such time as station S1 again selects a different class of service, calls involving station S1 will be processed in accordance with the preassigned class of service in the maner hereinbefore earlier set forth.

While the equipment of this invention has been described with reference to a particular embodiment wherein a telephone central office is arranged to respond to control signals from a telephone station to effect a change in the class of service treatment of that station, it is to be understood that such an embodiment is intended merely to be illustrative of the present invention and that numerous other arrangements may be devised by those skilled in the art without departing from the spirit and scope of the invention.

For example, the invention may be employed where it is desired to permit a station to cause the temporary suspension of service to that station for a predetermined interval of time.

Another example would be where it is desired to permit a station to indicate to the associated central office that thereafter different station equipment will be associated with the station line appearance, i.e., data processing equipment instead of the conventional telephone instrument.

What is claimed is:

1. In a telephone system,
a station which is assigned a particular class of service designation,
means selectively controllable by said station for storing another class of service designation,
and control means comprising first means for completing connections to and from said station in a manner determined by said assigned class of service designation, and
second means controlled by said storage means for inhibiting said first means and for completing connections to and from said station in a manner determined by any said stored class of service designation.

2. In a telephone system,
the combination set forth in claim 1 wherein said station is identifiable by aunique numerical designation, and
wherein said storage means comprises a memory having an address location exclusively associated with said unique numerical designation.

3. In a telephone system,
the combination set forth in claim 2 wherein said control means comprises means enabled in response to calls originating from said station and calls terminating to said station for detecting and registering said unique numerical designation, and
means controlled by said registering means for interrogating said storage means.

4. In a telephone system,
the combination set forth in claim 1 wherein said selectively controllable means is operable to record a predetermined code, and
said control means comprises means responsive to the storage of said predetermined code for inhibiting said second means.

5. In a telephone system,
the combination set forth in claim 1 further comprising means for automatically recording each usage of said station, and
means responsive to each enabling of said selectively controllable means for enabling said automatic recording means.

6. In a telephone system,
a plurality of stations each having a preassigned class of service designation,
means for registering said preassigned class of service designation for each said station,
means operable to store another class of service designation for each said station,
means controlled by said registering means for completing connections to and from any one said station,
means operable upon the enabling of said connection completing means for interrogating said store means, and
means responsive to said interrogating means for inhibiting said registration in said registering means of said preassigned class of service designation and for substituting therefor said stored class of service designation.

7. In a telephone system,
a telephone station having a first class of service assigned thereto,
call completing means for detecting and registering said first assigned class of service,
means responsive to the registration of said first assigned class of service for inhibiting said call completing means from completing connections to and from said telephone station in a manner determined by said first assigned class of service,
means controlled by said station for storing a second class of service,
means for interrogating said storage means,
means for registering said second class of service, and
means responsive to the registering of said second class of service for disabling said inhibiting means.

8. In a telephone system,
the combination set forth in claim 7 wherein said storing means further comprises means controlled by said station for replacing said stored second class of service with a predetermined coded designation.

9. In a telephone system,
the combination set forth in claim 8 further comprising means enabled in response to each enabling of said storage means for recording the identity of the said controlling station and for recording said stored second class of service or said coded designation.

10. In a communications system,
a station having an assigned class of service designation,
memory means controlled by said station for storing a nonassigned class of service designation, and
control means for completing calling connections for said station comprising
means for detecting said assigned class of service designation,
means for interrogating said memory means to ascertain the said nonassigned class of service designation,
means for interrogating said memory means to ascertain the said nonassigned class of service designation, call processing means selectively controlled by said detecting means for effecting said assigned class of service designation and in the alternative, by said interrogating means for effecting said nonassigned class of service designation, and means controlled by said memory means for inhibiting said detecting means.

11. In a telephone system for serving a plurality of subscriber stations, each having a preassigned class of service, control means for completing connections to and from said stations, means for supplying to said control means said preassigned class of service for a station, means responsive to said station for designating a different class of service, and means responsive to said designating means for preventing the supplying to said control means of said preassigned class of service for said station and for supplying thereto said different class of service instead.

References Cited

UNITED STATES PATENTS

| | | | |
|---|---|---|---|
| 3,445,602 | 5/1969 | Gitten et al. | 179—18 |
| 3,377,433 | 4/1968 | Whitney | 179—18 |
| 3,363,036 | 1/1968 | Kandel et al. | 179—18 |

KATHLEEN H. CLAFFY, Primary Examiner

T. W. BROWN, Assistant Examiner